(12) United States Patent
Aila et al.

(10) Patent No.: US 8,564,589 B1
(45) Date of Patent: Oct. 22, 2013

(54) SYSTEM AND METHOD FOR ACCELERATED RAY-BOX INTERSECTION TESTING

(75) Inventors: Timo Aila, Helsinki (FI); Samuli Laine, Helsinki (FI); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 286 days.

(21) Appl. No.: 12/780,964

(22) Filed: May 17, 2010

(51) Int. Cl.
*G06T 15/00* (2011.01)
*G06T 19/00* (2011.01)
*G06T 17/20* (2006.01)
*G06T 15/40* (2011.01)

(52) U.S. Cl.
CPC ............ *G06T 19/00* (2013.01); *G06T 17/20* (2013.01); *G06T 15/40* (2013.01)
USPC .......... 345/418; 345/419; 345/420; 345/421; 345/422; 345/423; 345/424; 345/426; 345/427

(58) Field of Classification Search
CPC .......... G06T 19/00; G06T 17/20; G06T 15/40
USPC .................................................. 345/418–426
See application file for complete search history.

(56) References Cited

U.S. PATENT DOCUMENTS

| | | | |
|---|---|---|---|
| 5,666,298 A | 9/1997 | Peleg et al. | |
| 5,675,825 A | 10/1997 | Dreyer et al. | |
| 5,802,336 A | 9/1998 | Peleg et al. | |
| 6,041,404 A | 3/2000 | Roussel et al. | |
| 6,243,803 B1 | 6/2001 | Abdallah et al. | |
| 6,247,116 B1 | 6/2001 | Abdallah et al. | |
| 6,418,529 B1 | 7/2002 | Roussel | |
| 6,651,151 B2 | 11/2003 | Palanca et al. | |
| 6,671,795 B1 | 12/2003 | Marr et al. | |
| 7,184,042 B2 * | 2/2007 | Keller | 345/426 |
| 7,227,547 B2 * | 6/2007 | Keller | 345/426 |
| 7,499,053 B2 * | 3/2009 | Keller et al. | 345/426 |
| 7,952,583 B2 * | 5/2011 | Waechter et al. | 345/426 |
| 2008/0043018 A1 * | 2/2008 | Keller et al. | 345/426 |
| 2008/0231633 A1 * | 9/2008 | Keller et al. | 345/426 |
| 2009/0167763 A1 * | 7/2009 | Waechter et al. | 345/426 |
| 2009/0213115 A1 * | 8/2009 | Keller et al. | 345/419 |
| 2009/0244058 A1 * | 10/2009 | Purcell et al. | 345/418 |
| 2009/0256845 A1 * | 10/2009 | Sevastianov et al. | 345/426 |
| 2010/0053162 A1 * | 3/2010 | Dammertz et al. | 345/426 |

OTHER PUBLICATIONS

Aila, T. et al., U.S. Appl. No. 12/780,963, filed May 17, 2010.
Aila, T. et al., U.S. Appl. No. 12/780,965, filed May 17, 2010.

* cited by examiner

*Primary Examiner* — Jin-Cheng Wang
(74) *Attorney, Agent, or Firm* — Zilka-Kotab, PC (57) ABSTRACT

A method for performing a ray-box intersection test includes forming a span extending between a first plane-ray intersection point and a second plane-ray intersection point, and increasing the span by relocating to a new position at least one of the first and second plane-ray intersection points. A box intersection span is constructed using the increased span, and the box intersection span, which corresponds to a node in a hierarchical acceleration structure, is tested for intersection with the ray.

16 Claims, 4 Drawing Sheets

Fig. 1

Prior Art

SYSTEM AND METHOD FOR ACCELERATED RAY-BOX INTERSECTION TESTING

CROSS REFERENCE TO RELATED APPLICATIONS

This application incorporates by reference in its entirety each of the following commonly-owned, concurrently filed US non-provisional patent applications:

US non-provisional patent application entitled "System and Method for Performing Predicated Selection of an Output Register," U.S. application Ser. No. 12/780,963, filed May 17, 2010; and US non-provisional patent application entitled "System and Method for Performing Ray Tracing Node Traversal in Image Rendering," U.S. application Ser. No. 12/780,965, filed May 17, 2010.

BACKGROUND

The present invention relates to ray-box intersection testing, and more particularly to system and method for accelerating ray-box intersection testing in image rendering applications.

Given a ray in space, it is desirable to discover which (if any) object (e.g. a geometric primitive or a group of primitives) in a scene is first intersected by the ray. In some cases, these geometric primitives (e.g. points, lines, triangles, etc.) may be organized in a tree, such as a bounding volume hierarchy (BVH), k-dimensional (kd) tree, or a binary space partitioning (BSP) tree. After the geometric primitives are organized in such tree, ray tracing involves traversing the tree, searching for intersected nodes that contain primitives.

Regardless of the particular type of structure used for organizing the primitives, there are two basic operations that need to be executed during the tracing of a ray. The first operation is node traversal, i.e. finding the nodes that may contain primitives that the ray intersects. The second operation is primitive intersection, i.e. intersecting the ray against the primitives in a node found during node traversal. The execution of a ray tracing algorithm includes repeated application of these two operations in some order.

While the nodes of a tree can theoretically be of any shape, typically they are defined using axis-aligned planes or boxes. The virtues of axis-aligned acceleration structures are numerous: fast and robust construction, compact storage, and fast intersection tests.

Figure 1:
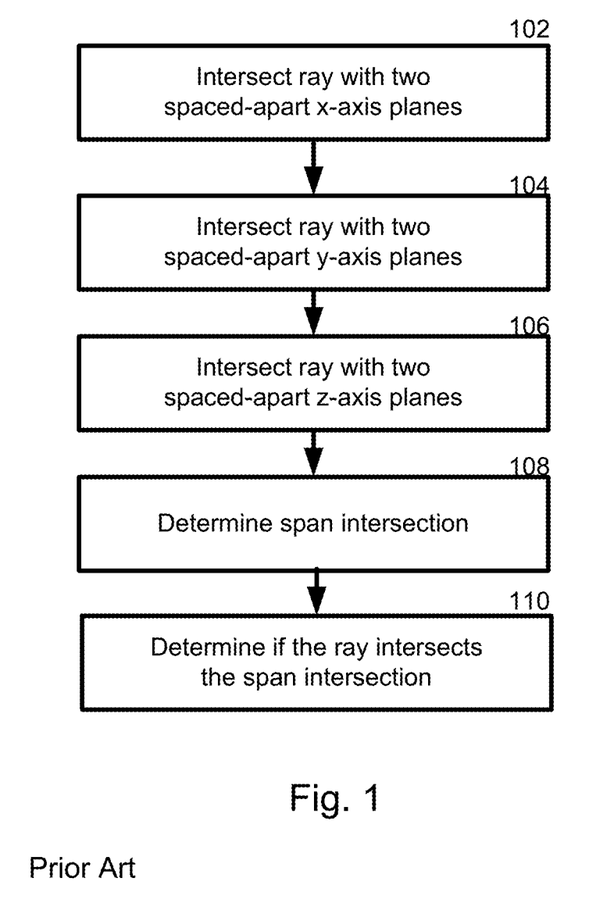
FIG. 1 illustrates a conventional method for performing a ray-box intersection test as known in the art.

FIG. 1 illustrates a conventional method for performing a ray-box intersection test as known in the art. At 102, the ray in question is intersected with two x-axis planes, at 104, the ray is intersected with y-axis planes, and at 106, the ray is intersected with two z-axis planes. At 108, the results of operations 102-106 are combined using minimum and maximum operations, particularly, an intersection (or span) is determined between a maximum value of the minimum x-, y- and z-plane endpoints and the a minimum value of the maximum x-, y- and z-plane endpoints. At 110, it is determined whether the span provided at 108 intersects the rays.

The following pseudocode describes a ray-box testing method using conventional instructions:

//O=ray origin (x, y, z)
//D=ray direction (x, y, z)
//B=axis-aligned box (xmin, ymin, zmin, xmax, ymax, zmax)
//tmin_ray=ray segment's minimum t value
//tmax_ray=ray segment's maximum t value
// RAY-BOX intersection (total 19 instructions)
// intersection with 6 axis-aligned planes (102, 104, 106), total 6 multiply-add instructions $tx0=(B \cdot xmin - O \cdot x)/D \cdot x;$ $tx1=(B \cdot xmax - O \cdot x)/D \cdot x;$ $ty0=(B \cdot ymin - O \cdot y)/D \cdot y;$ $ty1=(B \cdot ymax - O \cdot y)/D \cdot y;$ $tz0=(B \cdot zmin - O \cdot z)/D \cdot z;$ $tz1=(B \cdot zmax - O \cdot z)/D \cdot z;$ // combine the results to [tmin,tmax] span (108), total 10 min/max instructions $tmin = \max(\min(tx0,tx1), \min(ty0,ty1), \min(tz0,tz1));$ $tmax = \min(\max(tx0,tx1), \max(ty0,ty1), \max(tz0,tz1));$ // determine if the [tmin,tmax] overlaps with [tmin_ray, tmax_ray]
// (110), total 3 comparison instructions bool intersect=(tmin<=tmax && tmax>=tmin_ray && tmin<=tmax_ray);

Steps 102, 104 and 106 can be optimized, for example, by rewriting $(B \cdot xmin - O \cdot x)/D \cdot x$ as $(B \cdot xmin * 1/D \cdot x - O \cdot x/D \cdot x)$, where $(1/D \cdot x)$ and $(O \cdot x/D \cdot x)$ can be precomputed so that the calculation can be implemented using a single multiply-add (MAD) instruction. This, however, is prone to numerical inaccuracies and comes at the expense of additional register usage because D and O are required in other stages of ray tracing. The inaccuracies create the possibility that the box's size is not correctly computed, and a ray which in fact intersects the box near the box's boundaries is not detected. Further, the ray-box intersection takes roughly 20 instructions on a typical instruction set which creates a significant bottleneck in the ray-tracing computation. Accordingly, what is needed is a system and method which can carry out the ray-box intersection test with increased accuracy and speed.

SUMMARY

The present invention provides a system and method to overcome the aforementioned disadvantages, and in particular enable a ray-box intersection test to be carried out with increased accuracy using fewer instructions. In one exemplary embodiment, a method for performing a ray-box intersection test includes forming a span extending between a first plane-ray intersection point and a second plane-ray intersection point, and increasing the span by relocating to a new position at least one of the first and second plane-ray intersection points. A box intersection span is constructed using the increased span, and the box intersection span, which corresponds to a node in a hierarchical acceleration structure, is tested for intersection with the ray.

These and other aspects and features of the invention will be understood in view of the following drawings and description of exemplary embodiments.

For clarity, previously-described features are retain their reference indices in subsequent drawings

DETAILED DESCRIPTION OF EXEMPLARY EMBODIMENTS

Figure 2:
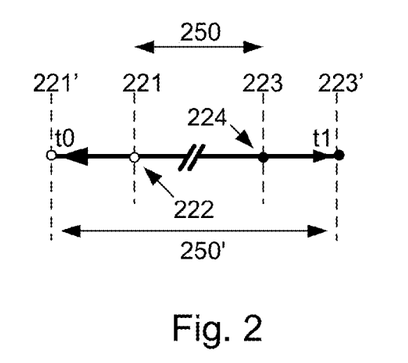
FIG. 2 illustrates an exemplary embodiment of the RAY_SLAB instruction in accordance with one embodiment of the invention.

FIG. 2 illustrates an exemplary embodiment of a RAY_SLAB instruction in accordance with one embodiment of the invention. The RAY_SLAB instruction computes the intersection points of two axis-aligned planes with a ray to provide a span extending between the two plane-ray intersection points, and performs a rounding operation in which the position of the plane-ray intersection points are extended outwardly, such that the span ("t range") is guaranteed to contain the two original plane-ray intersection points.

As shown in FIG. 2, axis-aligned planes 221 and 223 represent the planes which intersect a ray (not shown), and plane-ray intersection points 222 and 224 represent the endpoints corresponding to the intersection points of the planes 221, 223 with the ray. The RAY_SLAB instruction operates to round the position values of one or both of endpoints 222 and 224 of span 250, such that one or both endpoints 222, 223 are relocated away from the other endpoint, the final positions of the endpoints denoted as t0 (minimum endpoint, open circle) and t1 (maximum endpoint, darkened circle). Using this rounding operation, the resulting span 250' is guaranteed to include the true span 250 corresponding to a span formed between the exact plane-ray intersection points 222 and 224, and possibly greater than the length of the true span 250 if the magnitude of the rounding is sufficiently large to measure. In one embodiment, only one of the endpoints is relocated (in the direction away from the second endpoint), and the second endpoint remains stationary, resulting in an increased span.

In another embodiment, both endpoints 222 and 224 are relocated away from the other, i.e., the endpoint 222 moves left (decreases in position value) to plane 221', and the maximum endpoint 224 moves right (increases in position value) to plane 223', thereby extending the length of the span 225 to modified span 225'. The rounding operation and resulting span extension ensures that a ray intersecting a boundary of a node defined by the span is not missed. The instruction's operation may be described according to the following pseudocode:

```
(float tmin,float tmax)=RAY_SLAB(float p0,float
    p1,float orig,float dir)
{
    if (dir<0·f) // this is a sign bit test, so true also when
    dir==-0·f
    swap(p0, p1);
```

```
// division by 0·f must yield+-Inf with the same sign as
    first operand
// division by -0·f must yield+-Inf with opposite sign float tmin=roundTowardsNegativeInf((p0-orig)/dir);//
    <=exact answer float tmax=roundTowardsPositiveInf((p1-orig)/dir);//
    >=exact answer return (tmin, tmax);
}
```

In an exemplary embodiment, the RAY_SLAB instruction returns correctly rounded end points of the span, as described above, in a single instruction cycle. Other advantages of the instruction include returning the minimum and maximum endpoints t0 and t1 in the correct order, and the ability to reuse the result of the instruction directly without further processing.

Figure 3:
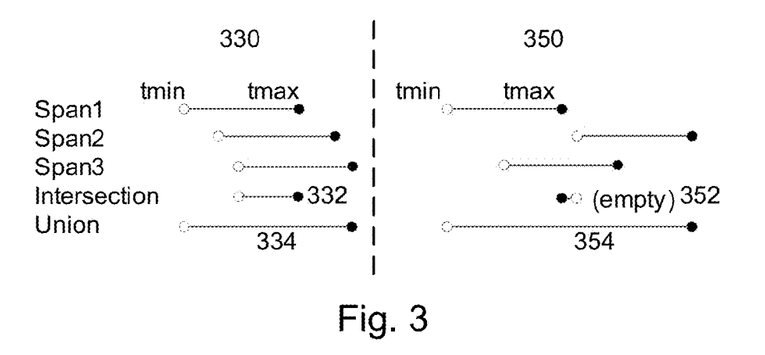
FIG. 3 illustrates an exemplary embodiment of the TRI_SPAN_OP instruction in accordance with one embodiment of the invention.

FIG. 3 illustrates an exemplary embodiment of a TRI_SPAN_OP instruction in accordance with one embodiment of the invention. The TRI_SPAN_OP instruction computes the intersection or union of three spans, depending upon the mode selected for the instruction. FIG. 3 illustrates two examples 330 and 350, each shown spans 1-3, an intersection result 332 and 352 and an union result 334 and 354, in which the open circles indicate tmin/t0 endpoints and the darkened circles indicate tmax/t1 endpoints. In the first example 330, the intersection result 332 includes an endpoint t0 as the maximum of all tmin endpoints from spans 1-3, and an endpoint t1 as the minimum of all tmax endpoints from spans 1-3. The union result 334 includes endpoint t0 as the minimum of all tmin endpoints from spans 1-3, and endpoint t1 as the maximum of all tmax endpoints from spans 1-3. In the second example 350, the intersection result 352 is empty because the maximum of all tmin endpoints from spans 1-3 (tmin of span 2) is greater than (i.e., to right of) the minimum of the tmax endpoint of span 1. The union result 354 includes endpoint t0 as the minimum of all tmin endpoints from spans 1-3, and endpoint t1 as the maximum of all tmax endpoints from spans 1-3. Further exemplary, the TRI_SPAN_OP instruction returns the combined span, as described above, in a single instruction cycle. The instruction's operation may be described according to the following exemplary pseudocode:

```
// Take an intersection or union of three spans
(float tmin, float tmax) =
TRI_SPAN_OP.[INTERSECT|UNION](float tmin0, float tmax0,
                                float tmin1, float tmax1,
                                float tmin2, float tmax2)
{
  float tmin, tmax;
  if (INTERSECT)
  {
    tmin = fmaxf(tmin0, fmaxf(tmin1, tmin2));
    tmax = fminf(tmax0, fminf(tmax1, tmax2));
  }
  If (UNION)
  {
    tmin = fminf(tmin0, fminf(tmin1, tmin2));
    tmax = fmaxf(tmax0, fmaxf(tmax1, tmax2));
  }
  return (tmin, tmax);
}
```

Figure 4:
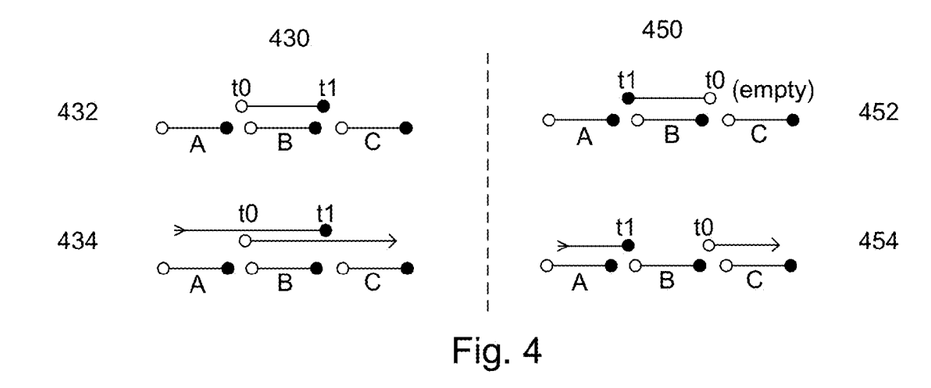
FIG. 4 illustrates an exemplary embodiment of the SPAN_TEST_OVERLAP instruction in accordance with one embodiment of the invention.

FIG. 4 illustrates an exemplary embodiment of a SPAN_TEST_OVERLAP instruction in accordance with one embodiment of the invention. The SPAN_TEST_OVERLAP instruction can be used to determine whether a span overlaps a ray. The instruction supports two span construction types (modes), interior and exterior. The result of the instruction is two booleans. For interior type spans, the first boolean indicates whether the span overlaps the ray, and the second boolean is always false, as the interior span only has one piece. For an exterior type span, the first boolean indicates whether the ]−INF, tmax] span overlaps the ray, and the second boolean indicates whether the [tmin, +INF[span overlaps the ray. Exemplary, the instruction returns one or two booleans (depending upon the span type selected, as noted above) in a single instruction cycle.

Described in another way, it is first determined whether the input span is to be interpreted as a plurality of exterior-extending spans (i.e., the exterior mode) or by a single span (the interior mode). If it is determined that the input span is composed of a plurality of exterior-extending spans (e.g., two spans ]−INF, t1], [t0, +INF[), the instruction determines which of the exterior-extending spans (0, 1, or both) intersects the ray. If it is determined that the input span is composed of a single span, the instruction determines whether the single span intersects the ray.

FIG. 4 illustrates two examples 430 and 450, each showing a span extending between endpoints tmin/t0 (open circle) and tmax/t1 (darkened circle). Segments A, B and C represent ray segments against which the span is to be tested for overlap. The first example 430 illustrates an interior span 432 and an exterior span 434 both in the condition in which t0≤t1. A second example 450 illustrates interior and exterior spans 452 and 454 in the condition in which t0>t1. The interior span 432 of the first example extends from t0 to t1, and overlaps only ray segment B. The exterior span 434 is composed of two separate spans ]−INF, t1], and [t0,+INF[. The first exterior span extending from ]−INF, t1] overlaps ray segments A and B, and the second exterior span extending from [t0, +INF [overlaps ray segments B and C. The second example 450 illustrates an interior span 452 and an exterior span 454 in the condition in which t0>t1. The interior span 452 of the second example is empty and there is no intersection of any of the ray segments A, B or C. The exterior span 454 includes two separate spans ]−INF, t1], and [t0,+INF[, in which t0 and t1 do not overlap. First exterior span ]−INF, t1] overlaps ray segment A and second exterior span [t0, +INF[overlaps with ray segments C.

The instruction's operation may be described according to the following exemplary pseudocode:

```
(bool intersect0, bool intersect1) =
SPAN_TEST_OVERLAP.[INTERIOR|EXTERIOR](float tmin0, float
                                      tmax0, // the span
                                      float tmin1, float
                                      tmax1) // the ray
{
  bool intersectHalfSpaceLo = (tmin1 <= tmax0);   // ]-INF,tmax0]
  bool intersectHalfSpaceHi = (tmax1 >= tmin0);   // [tmin0,INF[
  bool intersect0, intersect1;
  if(INTERIOR)
  {
    bool spanValid = (tmin0 <= tmax0);
    intersect0 = (spanValid && intersectHalfSpaceLo &&
    intersectHalfSpaceHi);
    intersect1 = false;
  }
  if(EXTERIOR)
  {
    intersect0 = intersectHalfSpaceLo;
    intersect1 = intersectHalfSpaceHi;
  }
  return (intersect0, intersect1);
}
```

The foregoing instructions may be included in an instruction set (either a new or existing instruction set), the instruction set disposed on a computer readable medium, such as a volatile or non-volatile memory element. Further particularly, the instructions may be compatible with the Compute Unified Device Architecture (CUDA™) computing architecture, in particular C for CUDA programming. The instruction may be compatible with other programming languages, for example, programming languages used for graphics applications, such as OpenGL and Direct3D.

EXAMPLES

The following exemplary embodiments illustrate a non-exhaustive list of ray-box testing methods in which one or more of the afore-described instructions are implemented. The ray-box intersection tests are described in terms of different hierarchical acceleration structures including a bounding volume hierarchy (BVH), a k-dimensional (kD) tree hierarchy, a bounding interval hierarchy (BIH), and a bounding plane hierarchy (BPH), although those skilled in the art will appreciate that nodes in other hierarchical acceleration structures may be processed using the operations exemplified by one or more of the new instructions as described herein. Further, each of the ray-box intersection tests may be practiced as a part of a larger ray-tracing image rendering process, in which one of the herein described ray-box intersection tests is performed as a part of a primitive intersection operation of the ray-tracing image rendering process. Further particularly, the node traversal operation of that ray-tracing image rendering process may include the node traversal operations as described in the Applicant's commonly-owned, copending US non-provisional patent application "System and Method for Performing Ray Tracing Node Traversal in Image Rendering," Ser. No. 12/780,965, herein incorporated by reference in its entirety. Further exemplary, execution of the instructions for the ray-box intersection tests may be carried out using predicated selection of output registers, as described in the Applicant's commonly-owned, copending US non-provisional patent application entitled "System and Method for Performing Predicated Selection of an Output Register," Ser. No. 12/780,963, herein incorporated by reference in its entirety. At the conclusion of the node traversal and primitive intersection operations, a scene of the intersected geometric primitives can be drawn or rendered using techniques known to the skilled person in computer graphics and rendering.

Ray-Box Testing in BVH Traversal

Some of the above-described instructions may be used to perform a ray-box intersection test for nodes of the bounding volume hierarchy (BVH). In an exemplary implementation in which a BVH node is tested for intersection, three RAY_SLAB instructions are used to generate x-axis, y-axis, and z-axis spans, one TRI_SPAN_OP·INTERSECT to combine the x-, y-, and z-axis spans, and a SPAN_TEST_OVERLAP instruction to test if the combined span intersects the ray. The process can be repeated for each of the two child nodes within a parent node. Exemplary pseudocode used to perform this operation may be as follows:

```
// BVH traversal
// Inputs:
// B0, B1=axis-aligned bounding boxes of two child nodes
// O, D=ray origin, direction
// tmin_ray, tmax_ray=active span of ray
// Outputs:
// isect0, isect1=does the ray span intersect box 0, box 1
// temp variables
```

```
float tminx, tmaxx, tminy, tmaxy, tminz, tmaxz, tmin,
    tmax;
// Intersect ray against first box
    (tminx,tmaxx)=RAY_SLAB(B0·xmin,B0·xmax,O·x,
        D·x);

(tminy,tmaxy)=RAY_SLAB(B0·ymin,B0·ymax,O·y,
        D·y);

(tminz,tmaxz)=RAY_SLAB(B0·zmin,B0·zmax,O·z,
        D·z);

(tmin,tmax)=TRI_SPAN_OP·INTERSECT(tminx,
        tmaxx,tminy,tmaxy,tminz,tmaxz);

(isect0,dummy)=SPAN_TEST_tmax,tmin_ray,
        tmax_ray);

// Intersect ray against second box
    (tminx,tmaxx)=RAY_SLAB(B1·xmin,B1·xmax,O·x,
        D·x);

(tminy,tmaxy)=RAY_SLAB(B1·ymin,B1·ymax,O·y,
        D·y);

(tminz,tmaxz)=RAY_SLAB(B1·zmin,B1·zmax,O·z,
        D·z);

(tmin,tmax)=TRI_SPAN_OP·INTERSECT(tminx,
        tmaxx,tminy,tmaxy,tminz,tmaxz);

(isect1,dummy)=SPAN_TEST_tmax,tmin_ray,
        tmax_ray);
```

It can be seen that the number of instructions needed to perform a ray-box intersection test is reduced from 19 in the conventional method to 5 in the present method. This reduction provides a significant advantage in increased processing efficiency and reduced computing time for determining ray intersections, and consequently, a faster rendering time. Further advantageously, implementation of the rounding operation in the span computation ensures that rays intersecting the box's borders are not missed.

Ray-Box Testing in KD-Tree Traversal

Figure 5:
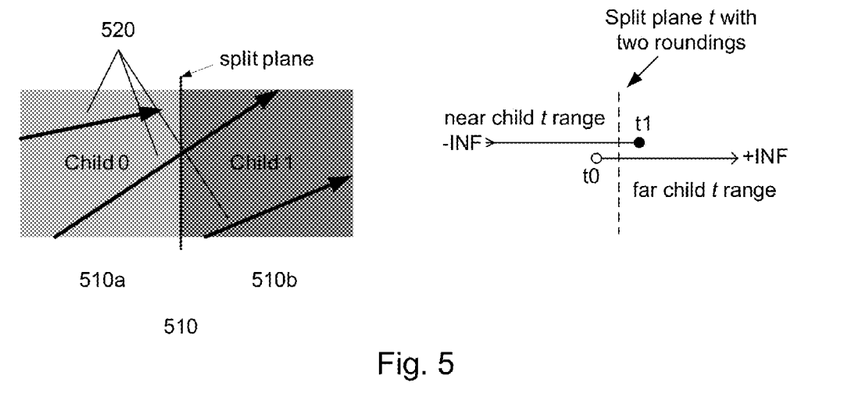
FIG. 5 illustrates an example of a ray-box intersection test for a node in a KD-tree hierarchical structure in accordance with one embodiment of the present invention.

FIG. 5 illustrates an example of a ray-box intersection test for a node in a KD-tree hierarchical structure in accordance with one embodiment of the present invention. KD-trees subdivide space so that every (non-leaf) node 510 is split into two child nodes 510a and 510b using an axis-aligned plane. During traversal the task is to determine if the ray 520 intersects one or both halves of a node 510. The ray 520 is known to enter the node 510, so that it cannot miss both child nodes 510a and 510b. The RAY_SLAB instruction can be used to obtain two correctly rounded t values for the split plane, and when interpreted as an exterior span, these constitute the t ranges of the two child nodes.

The RAY_SLAB instruction is used to provide the maximum and minimum endpoints of the span from the original split plane position. For the first sub-span extending from −INF, the RAY_SLAB instruction overestimates the original split plane position, defining the maximum endpoint t1 to the right of the split plane position. For the second span extending to +INF, the instruction underestimates the split plane position, defining the minimum endpoint t0 to the left of the split plane position, and the SPAN_TEST_OVERLAP instruction is used to compute the final intersection booleans.

Exemplary pseudocode used to perform this operation may be as follows:
```
// KD traversal
// Inputs:
// splitAxis=KD node split Axis
// splitPos=KD node split position
// O, D=ray origin, direction
// tmin_ray, tmax_ray=active span of ray
// Outputs:
// isect0, isect1=does the ray span intersect near/far child
// temp variables
float tmin, tmax;
// intersect ray against child nodes
    (tmin,tmax)=RAY_SLAB(splitPos,splitPos,O[spli-
        tAxis],D[splitAxis]);

(isect0,isect1)=SPAN_TEST_tmax,tmin_ray,
        tmax_ray);
```

Ray-Box Testing in Bounding Interval Hierarchy Traversal

Figure 6:
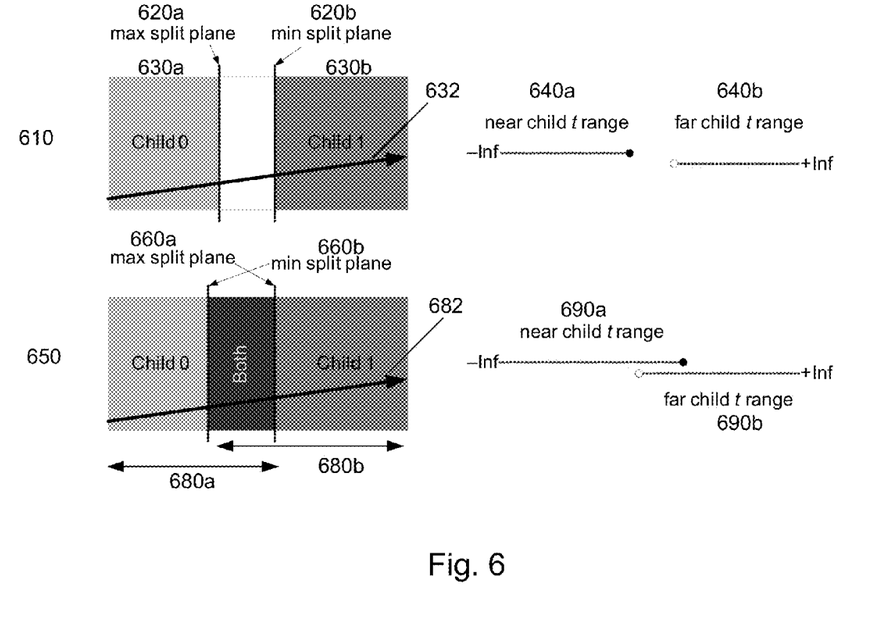
FIG. 6 illustrates two examples of a ray-box intersection test for a node in a bounding interval hierarchy in accordance with one embodiment of the present invention.

FIG. 6 illustrates two examples of a ray-box test for a node in a bounding interval hierarchy in accordance with one embodiment of the present invention. The bounding interval hierarchy is similar to the KD tree, except that two split positions are defined per node. This has two benefits. First, empty space in the middle of the node can be removed efficiently. Second, child nodes may overlap, simplifying the construction and enabling each primitive to reside in one leaf node only. The ray may intersect one, both, or neither of the children in a BIH node.

Two geometrically distinct embodiments can be handled with the same SPAN_TEST_OVERLAP instruction using the exterior mode. In a first embodiment 610, the maximum and minimum split planes 620a and 630b are ordered so that child nodes 630a and 630b do not overlap. For a ray 632 shown, application of the RAY_SLAB instruction generates two t values that are interpreted as an exterior span with two non-overlapping pieces 640a and 640b. The white clear endpoint represents tmin and darkened circle represents tmax. In the second embodiment 650, the split planes 660a and 660b are placed so that the child nodes 680a and 680b do overlap. In this instance, the corresponding exterior spans 690a and 690b returned by the instruction overlap. The RAY_SLAB instruction is used to correctly overestimate the spans, and the SPAN_TEST_OVERLAP instruction is used to compute the final intersection booleans. Exemplary pseudocode used to perform these operations may be as follows:
```
// BIH traversal
// Inputs:
// splitMin=min split plane position
// splitMax=max split plane position
// otherwise everything as in KD traversal
// intersect ray against child nodes
    (tmin,tmax)=RAY_SLAB(splitMin,splitMax,O[spli-
        tAxis],D[splitAxis]);

(isect0,isect1)=SPAN_TEST_tmax,tmin_ray,
        tmax_ray);
```

Some refinements can be implemented in order to provide additional advantages. For example, all data could be in 32-bit floating point (f32) format, but in practice it could be possible to do with 16-bit floating point (f16) in certain situations. This could lead to memory usage, bandwidth and register savings, too. For the instruction:

(float tmin,float tmax)=RAY_SLAB(float p0,float
    p1,float orig,float dir)

it would be possible to encode p0 and p1 as f16 values, allowing them to be packed into a single 32-bit register. This would reduce memory usage, bandwidth, and register usage of the calculation. Parameters tmin and tmax could also be packed as two f16 values into a single register as they are rounded conservatively correctly. In such an instance, further instructions that operate on these values would also support this packing. Further exemplary, ray origin and direction data remains f32, as this data format can be used in other parts of the ray tracer as well.

Figure 7:
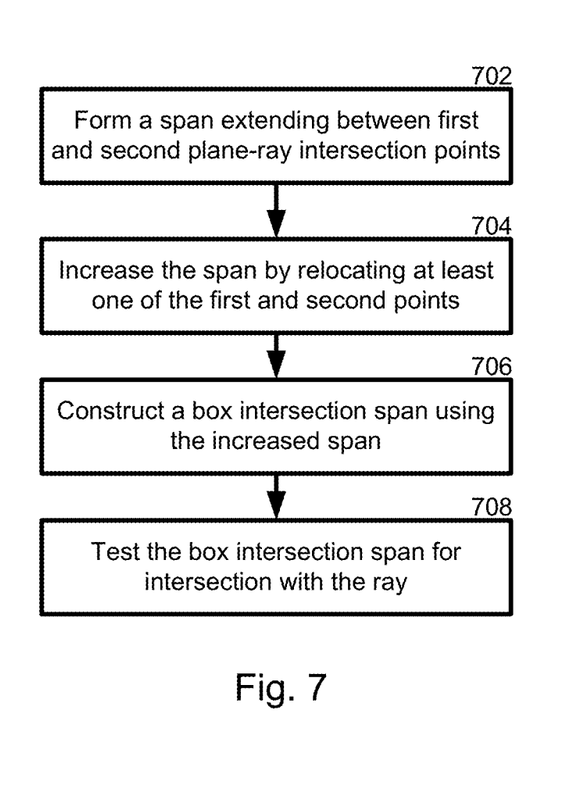
FIG. 7 illustrates a method for performing a ray-box intersection test according to one embodiment of the present invention.

FIG. 7 illustrates a method for performing a ray-box intersection test according to one embodiment of the present invention. The method includes forming a span extending between a first plane-ray intersection point and a second plane-ray intersection point at 702, and increasing the span by relocating to a new position at least one of the first and second plane-ray intersection points at 704. At 706, a box intersection span is constructed using the increased span, the box intersection span corresponding to a node of a hierarchical acceleration structure. At 708, the box intersection span is tested for intersection with the ray.

In an exemplary embodiment of operation 702 consistent with the testing of kd-tree or BIH nodes described herein, a single span is formed. In another exemplary embodiment of operation 802 consistent with the testing of BVH nodes described herein, three spans are formed. In general, any number of spans may be formed as required to construct the box intersection span and to test for its intersection with a ray.

In an exemplary embodiment of operation 704 consistent with the RAY_SLAB instruction, operation 704 includes increasing the span by relocating to a new position only one of the first and second plane-ray intersection points, i.e., only one of the span's endpoints, the relocation direction being opposite of the stationary endpoint. In another embodiment of operation 704 also consistent with the consistent with the RAY_SLAB instruction, the span is increased by relocating both endpoints, each endpoint moving away from the other.

Referring to operation 706, those skilled in the art will appreciate that the term "box" or "box intersection span" relates generally to a bounding space which may be of any arbitrary dimension. For BVH node testing, the box intersection span is formed using three orthogonally-disposed spans, and thus the box intersection span corresponds to a three dimensional geometry in this embodiment. For kd-tree and BIH node testing, the box intersection span is formed using a single span, the single span composed of two co-planar spans ranging from –INF, t1 and t0, +INF. Accordingly in these embodiments, the box intersection span corresponds to a one dimensional geometry. Further exemplary, the invention is not limited to a box or rectangular structure; the bounding box may be a bounding space of any shape or size.

In an exemplary embodiment of operation 708 consistent with BVH node testing, operation 708 includes determining whether the ray intersects a span extending between the maximum of the minimum x-axis, y-axis and z-axis endpoints, and the minimum of the maximum x-axis, y-axis and z-axis endpoints, consistent with the operation of the SPAN_TEST_OVERLAP·INTERIOR instruction. In another exemplary embodiment of 708 consistent with kd-tree and BIH node testing, operation 708 includes interpreting the span as a plurality of exterior-extending spans, and determining which of the exterior-extending spans is intersected by the ray, consistent with the operation of the SPAN_TEST_OVERLAP·EXTERIOR instruction illustrated in FIGS. 5 and 6.

As described above, the foregoing ray-box intersection tests can be implemented in a ray tracing method. In particular, the ray-box intersection test as described herein may be performed on at least one of the nodes in the hierarchical structure to determine if a ray intersects the node. If it is determined that the node does intersect the ray, a primitive intersection operation is performed, whereby a primitive included within the node is intersected with the ray. Alternatively, a determination may be made to determine if the intersected node includes any geometric primitives, and if not, a primitive intersection operation is not performed for the node.

Figure 8:
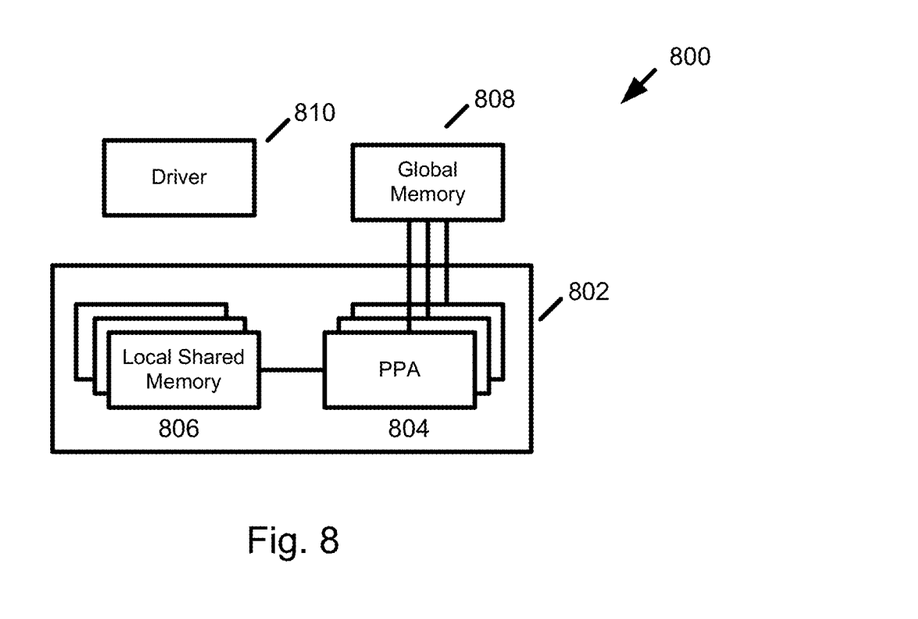
FIG. 8 illustrates an exemplary system for performing a ray-box intersection test in accordance with one embodiment of the present invention.

FIG. 8 illustrates an exemplary system 800 for performing a ray-box intersection test in accordance with one embodiment of the present invention. System 800 may represent a variety of different platforms, for example, a computer or workstation, a game console, a hand-held device such as a mobile telephone, or personal digital assistant, a graphics card, or a graphics processing sub-system which is implemented on a motherboard of a larger system such as a computer motherboard or graphics card. The system 800 is further operable to perform a ray-tracing operation, in which the ray-box intersection test is perform in accordance with node traversal operation of the ray tracing algorithm, and primitive intersection operations are performed on the nodes which are found to intersect the ray.

System 800 includes a processor 802 which is operable to perform one or more of the operations illustrated in FIG. 2-7. In a particular embodiment, the processor 802 which includes a plurality of parallel processing architectures 804, each configured to operate on a predetermined number of threads. Accordingly, each parallel processing architecture 804 may operate in parallel, while the corresponding threads may also operate in parallel. In a particular embodiment, the parallel processing architecture 304 is a single instruction multiple data (SIMD) architecture of a predefined SIMD width or "warp," for example 4, 8, 16, 32, 64, 128, 256, 512 or more threads.

The processor 802 may further include local shared memory 806, which may be physically or logically allocated to a corresponding parallel processing architecture 804. The system 800 may additionally include a global memory 808 which is accessible to each of the parallel processing architectures 804. The system 800 may further include one or more drivers 810 for controlling the operation of the processor 802 in accordance with the operations of FIGS. 2-7. The driver(s) 810 may include one or more libraries for facilitating control of the processor 802.

Further exemplary, the processor 802 includes an instruction set architecture operable to execute one or more of the new instructions described herein. The instruction set architecture of the processor 802 includes processing circuitry and logic gates (i.e., the processor's microarchitecture) such as adders, counters, registers ALUs, etc., to carry out each of the operations described in FIGS. 2-7 above.

The processor 802 may be implemented in various forms, for example, a central processing unit (CPU) intended to operate centrally within a computer or other programmable system. In another embodiment, the processor 802 is implemented as a graphics processing unit (GPU) which may be adapted for visual computing applications, or alternatively, as a general purpose GPU (GPGPU) implemented to carry out many functions normally performed by a CPU. In another embodiment, the processor 802 may be implemented as a microprocessor embedded within a larger/more complex device or system, the microprocessor omitting memory or other peripheral components provided by the larger device/system. A non-exhaustive list of the aforementioned systems which may incorporate the processor 802 of the present invention includes computers, workstations, cellular telephones, game consoles, and motherboards. The present invention can be implemented, e.g., to perform a ray-tracing process which is more computationally efficient compared to conventional techniques for performing ray-tracing. Exemplary applications using the improved ray-tracing process include collision detection, and graphics rendering in computer games, flight simulation, geographic information systems, medical imaging, and other applications in which graphics rendering is used.

As readily appreciated by those skilled in the art, the described processes and operations in FIGS. 2-7 may be implemented in hardware, software, firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other (electrically, mechanically, thermally, optically, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for performing a ray-box intersection test, the method comprising:
   identifying a node of a hierarchical acceleration structure that is intersected by a ray, wherein the node has at least one original split plane position;
   for the identified node, computing a first plane-ray intersection point and a second plane-ray intersection point, wherein the first plane-ray intersection point is a first point of intersection between the ray and one of the at least one original split plane position and wherein the second plane-ray intersection point is a second point of intersection between the ray and one of the at least one original split plane position;
   forming, utilizing a processor, a span extending between the first plane-ray intersection point and the second plane-ray intersection point;
   increasing the span outwardly by relocating each of the first and second plane-ray intersection points to new positions such that the first and second plane-ray intersection points are relocated away from one another, wherein the relocation of each of the first and second plane-ray intersection points to the new positions is such that the increased span is inclusive of the first plane-ray intersection point and the second plane-ray intersection point;
   constructing at least one box intersection span using the increased span, the at least one box intersection span corresponding to a child node of the identified node of the hierarchical acceleration structure; and
   testing the at least one box intersection span for intersection with the ray;
   wherein forming the span comprises forming a x-axis span, a y-axis span, and a z-axis span;
   wherein increasing the span comprises increasing the x-axis span to extend between minimum and maximum x-axis endpoints, increasing the y-axis span to extend between minimum and maximum y-axis endpoints, and increasing the z-axis span to extend between minimum and maximum z-axis endpoints;
   wherein constructing the at least one box intersection span comprises determining the maximum of the minimum x-axis, y-axis and z-axis endpoints, and determining the minimum of the maximum x-axis, y-axis and z-axis endpoints;
   wherein testing the at least one box intersection span for intersection with the ray comprises determining whether the ray intersects a span extending between the maximum of the minimum x-axis, y-axis and z-axis endpoints, and the minimum of the maximum x-axis, y-axis and z-axis endpoints.

2. The method of claim 1, wherein testing the at least one box intersection span for intersection with the ray further comprises:
   interpreting the at least one box intersection span as a plurality of exterior-extending spans; and
   determining which of the exterior extending spans intersects the ray.

3. The method of claim 1, wherein the hierarchical acceleration structure is one of a bounding volume hierarchy, a k-dimensional tree hierarchy, and a bounding interval hierarchy.

4. The method of claim 3, wherein the hierarchical acceleration structure includes the bounding volume hierarchy, and the at least one box intersection span is constructed using three orthogonally-disposed spans, such that the at least one box intersection span corresponds to a three-dimensional geometry.

5. The method of claim 3, wherein the hierarchical acceleration structure includes the bounding interval hierarchy, and the at least one box intersection span is constructed using only the increased span comprising two co-planar spans such that the at least one box intersection span corresponds to a one dimensional geometry.

6. The method of claim 1, wherein the at least one box intersection span is an exterior type span and includes:
   a first box intersection span associated with a first child node and extending from negative infinite to the new position of the first plane-ray intersection point (]−INF, tmax]), and a second box intersection span associated with a second child node and extending from the new position of the second plane-ray intersection point to positive infinite ([tmin, −INF[), wherein a result of testing the at least one box intersection span for intersection with the ray returns two Booleans;

wherein a first one of the two Booleans indicates whether the first box intersection span overlaps the ray;

wherein a second one of the two Booleans indicates whether the second box intersection span overlaps the ray.

7. A method for tracing a ray using a hierarchical structure composed of a plurality of hierarchically ordered nodes, the method comprising:

performing a ray-box intersection test for at least one of a plurality of hierarchically ordered nodes, comprising:

identifying a node of a hierarchical acceleration structure that is intersected by a ray, wherein the node has at least one original split plane position;

for the identified node, computing a first plane-ray intersection point and a second plane-ray intersection point, wherein the first plane-ray intersection point is a first point of intersection between the ray and one of the at least one original split plane position and wherein the second plane-ray intersection point is a second point of intersection between the ray and one of the at least one original split plane position;

forming, utilizing a processor, a span extending between the first plane-ray intersection point and the second plane-ray intersection point;

increasing the span outwardly by relocating each of the first and second plane-ray intersection points to new positions such that the first and second plane-ray intersection points are relocated away from one another, wherein the relocation of each of the first and second plane-ray intersection points to the new positions is such that the increased span is inclusive of the first plane-ray intersection point and the second plane-ray intersection point;

constructing at least one box intersection span using the increased span, the at least one box intersection span corresponding to a child node of the identified node of the hierarchical acceleration structure; and testing the at least one box intersection span for intersection with the ray; and if the ray is determined to intersect the at least one box intersection span, intersecting the ray with a primitive included within the child node corresponding to the at least one box intersection span;

wherein forming the span comprises forming a x-axis span, a y-axis span, and a z-axis span;

wherein increasing the span comprises increasing the x-axis span to extend between minimum and maximum x-axis endpoints, increasing the y-axis span to extend between minimum and maximum y-axis endpoints, and increasing the z-axis span to extend between minimum and maximum z-axis endpoints;

wherein constructing the at least one box intersection span comprises determining the maximum of the minimum x-axis, y-axis and z-axis endpoints, and determining the minimum of the maximum x-axis, y-axis and z-axis endpoints;

wherein testing the at least one box intersection span for intersection with the ray comprises determining whether the ray intersects a span extending between the maximum of the minimum x-axis, y-axis and z-axis endpoints, and the minimum of the maximum x-axis, y-axis and z-axis endpoints.

8. The method of claim 7, wherein testing the at least one box intersection span for intersection with the ray further comprises:

interpreting the at least one box intersection span as a plurality of exterior-extending spans; and determining which of the exterior extending spans intersects the ray.

9. A processor operable to perform a ray-box intersection test, the processor comprising:

processor circuitry operable to identify a node of a hierarchical acceleration structure that is intersected by a ray, wherein the node has at least one original split plane position;

processor circuitry operable to compute, for the identified node, a first plane-ray intersection point and a second plane-ray intersection point, wherein the first plane-ray intersection point is a first point of intersection between the ray and one of the at least one original split plane position and wherein the second plane-ray intersection point is a second point of intersection between the ray and one of the at least one original split plane position;

processor circuitry operable to form a span which extends between the first plane-ray intersection point and the second plane-ray intersection point;

processor circuitry operable to increase the span outwardly by relocating each of the first and second plane-ray intersection points to new positions such that the first and second plane-ray intersection points are relocated away from one another, wherein the relocation of each of the first and second plane-ray intersection points to the new positions is such that the increased span is inclusive of the first plane-ray intersection point and the second plane-ray intersection point;

processor circuitry operable to construct at least one box intersection span using the increased span, the at least one box intersection span corresponding to a child node of the identified node of the hierarchical acceleration structure; and processor circuitry operable to test the at least one box intersection span for intersection with the ray;

wherein the processor circuitry operable to form the span is operable to form a x-axis span, a y-axis span, and a z-axis span;

wherein the processor circuitry operable to increase the span is operable to increase the x-axis span to extend between minimum and maximum x-axis endpoints, increase the y-axis span to extend between minimum and maximum y-axis endpoints, and increase the z-axis span to extend between minimum and maximum z-axis endpoints;

wherein the processor circuitry operable to construct the at least one box intersection span is operable to determine the maximum of the minimum x-axis, y-axis and z-axis endpoints, and to determine the minimum of the maximum x-axis, y-axis and z-axis endpoints:

wherein the processor circuitry operable to test the at least one box intersection span for intersection with the ray is operable to determine whether the ray intersects a span extending between the maximum of the minimum x-axis, y-axis and z-axis endpoints and the minimum of the maximum x-axis y-axis and z-axis endpoints.

10. The processor of claim 9, wherein the processor circuitry operable to test the at least one box intersection span for intersection with the ray is further operable to:

interpret the at least one box intersection span as a plurality of exterior-extending spans; and determine which of the exterior extending spans intersects the ray.

11. A processor operable to perform tracing a ray using a hierarchical structure composed of a plurality of hierarchically ordered nodes, the processor comprising:

processing circuitry operable to perform a ray-box intersection test for at least one of a plurality of hierarchically ordered nodes, comprising:

processing circuitry operable to identify a node of a hierarchical acceleration structure that is intersected by a ray, wherein the node has at least one original split plane position;

processing circuitry operable to compute, for the identified node, a first plane-ray intersection point and a second plane-ray intersection point, wherein the first plane-ray intersection point is a first point of intersection between the ray and one of the at least one original split plane position and wherein the second plane-ray intersection point is a second point of intersection between the ray and one of the at least one original split plane position;

processing circuitry operable to form a span extending between the first plane-ray intersection point and the second plane-ray intersection point;

processing circuitry operable to increase the span outwardly by relocating each of the first and second plane-ray intersection points to new positions such that the first and second plane-ray intersection points are relocated away from one another, wherein the relocation of each of the first and second plane-ray intersection points to the new positions is such that the increased span is inclusive of the first plane-ray intersection point and the second plane-ray intersection point;

processing circuitry operable to construct at least one box intersection span using the increased span, the at least one box intersection span corresponding to a child node of the identified node of the hierarchical acceleration structure; and processing circuitry operable to test the at least one box intersection span for intersection with the ray; and processing circuitry operable to intersect the ray with a primitive included within the child node corresponding to the at least one box intersection span if the ray is determined to intersect the at least one box intersection span;

wherein the processor circuitry operable to form the span is operable to form a x-axis span, a y-axis span, and a z-axis span;

wherein the processor circuitry operable to increase the span is operable to increase the x-axis span to extend between minimum and maximum x-axis endpoints, increase the y-axis span to extend between minimum and maximum y-axis endpoints, and increase the z-axis span to extend between minimum and maximum z-axis endpoints;

wherein the processor circuitry operable to construct the at least one box intersection span is operable to determine the maximum of the minimum x-axis, y-axis and z-axis endpoints, and to determine the minimum of the maximum x-axis, y-axis and z-axis endpoints;

wherein the processor circuitry operable to test the at least one box intersection span for intersection with the ray is operable to determine whether the ray intersects a span extending between the maximum of the minimum x-axis, y-axis and z-axis endpoints, and the minimum of the maximum x-axis, v-axis and z-axis endpoints.

12. The processor of claim 11, wherein the processor circuitry operable to test the at least one box intersection span for intersection with the ray is further operable to:

interpret the at least one box intersection span as a plurality of exterior-extending spans; and determine which of the exterior extending spans intersects the ray.

13. A computer program product, resident on a non-transitory computer readable medium, the computer program product including executable instructions which, when executed by a processor, cause the processor to perform a method comprising:

identifying a node of a hierarchical acceleration structure that is intersected by a ray, wherein the node has at least one original split plane position;

for the identified node, computing a first plane-ray intersection point and a second plane-ray intersection point, wherein the first plane-ray intersection point is a first point of intersection between the ray and one of the at least one original split plane position and wherein the second plane-ray intersection point is a second point of intersection between the ray and one of the at least one original split plane position;

forming a span extending between the first plane-ray intersection point and the second plane-ray intersection point;

increasing the span outwardly by relocating each of the first and second plane-ray intersection points to new positions such that the first and second plane-ray intersection points are relocated away from one another, wherein the relocation of each of the first and second plane-ray intersection points to the new positions is such that the increased span is inclusive of the first plane-ray intersection point and the second plane-ray intersection point;

constructing at least one box intersection span using the increased span, the at least one box intersection span corresponding to a child node of the identified node of the hierarchical acceleration structure; and testing the at least one box intersection span for intersection with the ray;

wherein forming the span comprises forming a x-axis span, a y-axis span, and a z-axis span;

wherein increasing the span comprises increasing the x-axis span to extend between minimum and maximum x-axis endpoints, increasing the y-axis span to extend between minimum and maximum y-axis endpoints, and increasing the z-axis span to extend between minimum and maximum z-axis endpoints;

wherein constructing the at least one box intersection span comprises determining the maximum of the minimum x-axis, y-axis and z-axis endpoints, and determining the minimum of the maximum x-axis, y-axis and z-axis endpoints;

wherein testing the at least one box intersection span for intersection with the ray comprises determining whether the ray intersects a span extending between the maximum of the minimum x-axis, y-axis and z-axis endpoints, and the minimum of the maximum x-axis, v-axis and z-axis endpoints.

14. The computer program product of claim 13, wherein testing the at least one box intersection span for intersection with the ray further comprises:

interpreting the at least one box intersection span as a plurality of exterior-extending spans; and determining which of the exterior extending spans intersects the ray.

15. The computer program product of claim 13, wherein the hierarchical acceleration structure is selected from a group consisting of a bounding volume hierarchy, a k-dimensional tree hierarchy, and a bounding interval hierarchy.

16. A computer program product, resident on a non-transitory computer readable medium, the computer program product including executable instructions which, when executed by a processor, cause the processor to perform a method comprising:
  performing a ray-box intersection test for at least one of a plurality of hierarchically ordered nodes, comprising:
    identifying a node of a hierarchical acceleration structure that is intersected by a ray, wherein the node has at least one original split plane position;
    for the identified node, computing a first plane-ray intersection point and a second plane-ray intersection point, wherein the first plane-ray intersection point is a first point of intersection between the ray and one of the at least one original split plane position and wherein the second plane-ray intersection point is a second point of intersection between the ray and one of the at least one original split plane position;
    forming a span extending between the first plane-ray intersection point and the second plane-ray intersection point;
    increasing the span outwardly by relocating each of the first and second plane-ray intersection points to new positions such that the first and second plane-ray intersection points are relocated away from one another, wherein the relocation of each of the first and second plane-ray intersection points to the new positions is such that the increased span is inclusive of the first plane-ray intersection point and the second plane-ray intersection point;
    constructing at least one box intersection span using the increased span, the at least one box intersection span corresponding to a child node of the identified node of the hierarchical acceleration structure; and
    testing the at least one box intersection span for intersection with the ray; and
  intersecting the ray with a primitive included within the child node corresponding to the at least one box intersection span if the ray is determined to intersect the at least one box intersection span;
  wherein forming the span comprises forming a x-axis span, a y-axis span, and a z-axis span;
  wherein increasing the span comprises increasing the x-axis span to extend between minimum and maximum x-axis endpoints, increasing the y-axis span to extend between minimum and maximum y-axis endpoints, and increasing the z-axis span to extend between minimum and maximum z-axis endpoints;
  wherein constructing the at least one box intersection span comprises determining the maximum of the minimum x-axis, y-axis and z-axis endpoints, and determining the minimum of the maximum x-axis, y-axis and z-axis endpoints;
  wherein testing the at least one box intersection span for intersection with the ray comprises determining whether the ray intersects a span extending between the maximum of the minimum x-axis, y-axis and z-axis endpoints, and the minimum of the maximum x-axis, y-axis and z-axis endpoints.

* * * * *